United States Patent
Choi et al.

(10) Patent No.: US 7,846,584 B2
(45) Date of Patent: Dec. 7, 2010

(54) LITHIUM ION BATTERY HAVING AN IMPROVED CONSERVED PROPERTY AT A HIGH TEMPERATURE

(75) Inventors: Seung-Don Choi, Daejeon (KR); Hyeong Jin Kim, Daejeon (KR)

(73) Assignee: LG Chem, Ltd. (KR)

(*) Notice: Subject to any disclaimer, the term of this patent is extended or adjusted under 35 U.S.C. 154(b) by 988 days.

(21) Appl. No.: 10/559,904

(22) PCT Filed: Jul. 28, 2004

(86) PCT No.: PCT/KR2004/001897
§ 371 (c)(1),
(2), (4) Date: Dec. 8, 2005

(87) PCT Pub. No.: WO2005/013395
PCT Pub. Date: Feb. 10, 2005

(65) Prior Publication Data
US 2006/0188783 A1  Aug. 24, 2006

(30) Foreign Application Priority Data
Jul. 30, 2003  (KR) ............... 10-2003-0052889

(51) Int. Cl.
*H01M 4/58* (2010.01)
(52) U.S. Cl. ............... 429/218.1; 429/128; 429/231.6
(58) Field of Classification Search ............ 429/128, 429/218.1
See application file for complete search history.

(56) References Cited
U.S. PATENT DOCUMENTS
4,913,988 A * 4/1990 Langan ............ 429/333
6,998,071 B2 * 2/2006 Maeda et al. ............ 252/521.2
7,138,209 B2  11/2006 Kweon et al.

FOREIGN PATENT DOCUMENTS

| CN | 1348225 A | 5/2005 |
|---|---|---|
| EP | 0 771 041 A1 | 5/1997 |
| EP | 1 054 463 A1 | 11/2000 |
| EP | 1 281 673 A1 | 2/2003 |
| EP | 1 304 758 A1 | 4/2003 |
| JP | 04-259755 | 9/1992 |
| JP | 7-192721 | 7/1995 |

(Continued)

OTHER PUBLICATIONS

Chinese Office Action dated Oct. 19, 2007 for Application No. 20040020086.9.

(Continued)

*Primary Examiner*—Dah-Wei D Yuan
*Assistant Examiner*—Patricia Davis
(74) *Attorney, Agent, or Firm*—Cantor Colburn LLP

(57) ABSTRACT

Disclosed are a cathode for a battery and a lithium ion battery. The cathode for a battery comprises a metal hydroxide having a large specific surface area as a cathode additive. The lithium ion battery comprises a cathode, an anode and a non-aqueous electrolyte, wherein the cathode comprises a metal hydroxide having a large specific surface area as a cathode additive. When a metal hydroxide having a large specific surface area is used as a cathode additive, excellent storage properties of a battery at a high temperature can be obtained, even if the metal hydroxide is used in a small amount.

4 Claims, 1 Drawing Sheet

FOREIGN PATENT DOCUMENTS

| | | | |
|---|---|---|---|
| JP | 10-255839 | | 9/1998 |
| JP | 11-191417 | | 7/1999 |
| JP | 2000-40505 | | 2/2000 |
| JP | 2000-173599 | | 6/2000 |
| JP | 2001223024 A | | 8/2001 |
| JP | 2002-008718 | | 1/2002 |
| JP | 2002008718 | * | 1/2002 |
| JP | 2002083632 | * | 3/2002 |
| JP | 2002083632 A | | 3/2002 |
| JP | 2003-173814 | | 6/2003 |
| KR | 1020020085675 A | | 11/2002 |

OTHER PUBLICATIONS

Chinese Office Action dated Nov. 30, 2007 for Application No. 20040024306.5.

Written Opinion dated Nov. 23, 2004 for Application No. PCT/KR2004/001897.

PCT International Search Report; International Application No. PCT/KR2004/001897; International Filing Date: Jul. 28, 2004.

Supplementary European Search Report dated May 4, 2010.

Office Action issued by the Canadian Patent Office on Jan. 15, 2010.

* cited by examiner

LITHIUM ION BATTERY HAVING AN IMPROVED CONSERVED PROPERTY AT A HIGH TEMPERATURE

TECHNICAL FIELD

The present invention relates to a cathode for a battery comprising a cathode additive for improving storage properties at a high temperature, and a lithium ion battery comprising the same.

BACKGROUND ART

In general, a lithium ion battery is used at a high drive voltage (0 to 5V). Therefore, when a lithium ion battery is exposed under a high temperature (40° C.) for a long time after being charged completely, self-discharge may occur due to a high voltage difference between a cathode and an anode. Additionally, a cathode has reactivity to a non-aqueous electrolyte so that decomposition may be generated and thus the capacity of a battery may decrease and the impedance of a battery may rapidly increase. This has been one of the most serious problems of lithium ion batteries.

To solve this, many attempts have been made to decrease the reactivity of an electrode to an electrolyte by adding a small amount of additives to an anode, an electrolyte or a cathode, or by appling a coating layer formed of inorganic materials or organic materials on the powder surface of a cathode or an anode. Additionally, Japanese Patent Laid-Open No. 98-255839 discloses that alkaline earth metal hydroxides are partially incorporated into a cathode active material to prevent reduction of battery capacity after storage at a high temperature.

However, there is no description with regard to the incorporation of any other metal hydroxides except for alkaline earth metal hydroxides in a cathode active material, for the purpose of improving storage properties of a battery at a high temperature.

Further, although metal hydroxides are good additives for improving storage properties of a battery at a high temperature, metal hydroxides are nonconductors by nature. Accordingly, if metal hydroxides are added to cathode active materials in an excessive amount, they may decrease battery capacity and degrade storage properties of a battery at a high temperature. Additionally, because metal hydroxides are not capable of lithium ion intercalation/deintercalation, increase of the amount of metal hydroxides added to a cathode of a battery results in decrease of the amount of a cathode active material that may be incorporated into the cathode, thereby causing decrease of battery capacity. Therefore, in order to minimize decrease of battery capacity, it is necessary to minimize the amount of metal hydroxides added to a cathode of a battery. However, it has remained undiscovered heretofore that the specific surface area of a metal hydroxide added to a cathode of a battery is related with storage properties of a battery at a high temperature, and that a small amount of metal hydroxide may be used to improve storage properties of a battery at a high temperature, based on such relationship.

DISCLOSURE OF THE INVENTION

This inventors have found that storage properties of a battery at a high temperature can be improved by adding a metal hydroxide to the cathode of a battery as a cathode additive, and such improvement is related with the specific surface area of powder of metal hydroxides. In other words, when a metal hydroxide having a large specific surface area is added to a cathode of a battery as a cathode additive, storage properties of a battery at a high temperature can be improved even if the metal hydroxide is used in a relatively small amount. As a result, decrease of battery capacity due to the addition of metal hydroxides can be minimized.

Therefore, the present invention has been made based on this finding, and it is an object of the present invention to provide a cathode for a battery comprising a metal hydroxide having a large specific surface area as a cathode additive, and a lithium ion battery comprising the same.

According to an aspect of the present invention, there is provided a cathode for a battery comprising a metal hydroxide having a large specific surface area as a cathode additive. According to another aspect of the present invention, there is provided a lithium ion battery comprising a cathode, an anode and a non-aqueous electrolyte, wherein the cathode comprises a metal hydroxide having a large specific surface area as a cathode additive.

Hereinafter, the present invention will be explained in detail.

As described above, this inventors have found that use of a metal hydroxide as a cathode additive improves storage properties of a battery at a high temperature, and the larger the specific surface area of powder of a metal hydroxide is, the better such improvement becomes. It is considered that this results from the effect of the surface of a metal hydroxide on other substances in a battery such as an electrolyte. It seems that the aforesaid effect may prevent the generation of substances increasing battery resistance such as LiF, HF, etc. According to this mechanism, the effect provided by the present invention is in proportion to the surface area of a metal hydroxide as a cathode additive. This is supported by the following Examples and Comparative Examples.

Therefore, according to the invention, by using a metal hydroxide having a large specific surface area as a cathode additive, it is possible to obtain excellent storage properties of a battery at a high temperature, namely to minimize decrease of battery capacity and to prevent increase of battery impedance, even if the metal hydroxide is added in a relatively small amount. As a result, a problem occurring in the prior art can be minimized; the problem being that increase of amount of a metal hydroxide added to a cathode may decrease battery capacity.

According to the present invention, the specific surface area of a metal hydroxide is 1 $m^2/g$ or more, preferably 2.5 $m^2/g$ or more, and more preferably 7 $m^2/g$ or more. As described above, the larger the specific surface area of a metal hydroxide used as a cathode additive is, the better the resultant effect is. Meanwhile, although it is preferable that the specific surface area of a metal hydroxide is as large as possible, the specific surface area may be limited by conditions of battery manufactured, methods for preparing metal hydroxides, etc. Considering the conditions under which cathode slurry is coated on an electrode collector to form a cathode, the specific surface area of the metal hydroxide is preferably 100 $m^2/g$ or less.

Examples of metal hydroxides that may be used in the present invention include $Al(OH)_3$, $Mg(OH)_2$, $Ca(OH)_2$, LiOH, NaOH, etc. In addition, the metal hydroxides are preferably used in an amount of greater than 0 wt % and not more than 10 wt %. Although such metal hydroxides can improve the storage properties of a battery at a high temperature even if they are added in a very small amount, adding them to a cathode in an amount of greater than 10 wt % may increase resistance due to the nature of metal hydroxides as a nonconductor, thereby decreasing battery capacity and deteriorating storage properties of a battery at a high temperature. Further, when such metal hydroxides are added to a cathode in an amount of greater than 10 wt %, the amount of a cathode active material capable of lithium ion intercalation/deintercalation is decreased accordingly, and thus battery capacity is reduced. This is clearly shown in the results of the following Examples 1 to 5 and Comparative Example 1.

The cathode according to the present invention can be prepared by introducing cathode materials including a cathode active material and a metal hydroxide having a large specific surface area into a solvent, mixing them to prepare cathode slurry, coating the slurry on a cathode collector, and drying the solvent.

According to the present invention, lithium-containing transition metal compounds may be used as a cathode active material. Non-limitative examples of the lithium-containing transition metal compounds include $LiCoO_2$, $LiNiO_2$, $LiMn_2O_4$, $LiMnO_2$, $LiCoPO_4$, $LiNi_{1-X}Co_XM_YO_2$ (wherein M=Al, Ti, Mg or Zr, 0<X≦1 and 0≦Y≦0.2), $LiNi_xCo_YMn_{1-X-Y}O_2$ (wherein, 0<X≦0.5 and 0<Y≦0.5), $LiM_xM'_yMn_{(2-x-y)}O_4$ (wherein each of M and M'=V, Cr, Fe, Co, Ni or Cu, 0<X≦1 and 0<Y≦1), or the like. Each compound may be used alone or in a mixture of two or more of them.

Further, the present invention also provides a lithium ion battery comprising the cathode according to the present invention. The lithium ion battery according to the present invention can be manufactured by using conventional materials and methods, except that the metal hydroxide having a large specific surface area is added to a cathode as a cathode additive. For example, the lithium ion battery of the present invention can be manufactured by introducing an electrode assembly obtained by laminating a cathode, an anode and a separator between the cathode and the anode into a battery casing and introducing a non-aqueous electrolyte thereto, according to a conventional method.

In the battery according to the present invention, carbon, lithium metal or lithium alloys which are capable of lithium ion intercalation/deintercalation may be used as an anode. Metal oxides capable of lithium ion intercalation/deintercalation and having an electric potential to lithium of less than 2V may be used. Examples of such metal oxides include $TiO_2$, $SnO_2$, $Li_4Ti_5O_{12}$, etc. Electrolytes that may be used in the battery of the present invention may include cyclic carbonates such as ethylene carbonate (EC), propylene carbonate (PC) and butylene carbonate(BC), or linear carbonates such as diethyl carbonate (DEC), dimethyl carbonate (DMC), ethyl methyl carbonate (EMC) and methyl propyl carbonate (MPC), but are not limited thereto.

In order to further improve storage properties of the lithium ion battery at a high temperature, at least one additive selected from the group consisting of the compounds of formula 1, formula 2, formula 3 and formula 4 may be added to the electrolyte:

[formula 1]

[formula 2]
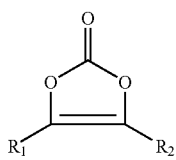

[formula 3]
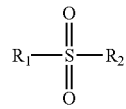

[formula 4]
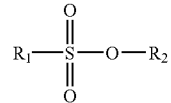

wherein, each of $R_1$ and $R_2$ is independently selected from the group consisting of H, a $C_1$-$C_5$ alkenyl group, a $C_1$-$C_5$ alkyl group, a halogen atom, and a phenyl group and a phenoxy group non-substituted or substituted with a $C_1$-$C_5$ alkyl group or a halogen atom (formulae 1,3 and 4); and R is a $C_1$-$C_5$ alkenyl group or a $C_1$-$C_5$ alkyl group (formula 2).

Compounds of formula 1 may include vinylene carbonate (VC), methyl esters, etc., but are not limited thereto.

Compounds of formulae 2 to 4 may include propane sultone (PS), propene sultone, dimethyl sulfone, diphenyl sulfone, divinyl sulfone, methanesulfonic acid, etc., but are not limited thereto.

The electrolyte may further comprise conventional additives known in the art.

The lithium ion battery may have a cylindrical shape, a prismatic shape, a pouch shape or a coin shape.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention. The following examples are illustrative only and the scope of the present invention is not limited thereto.

Example 1

A coin-type battery was manufactured by using a conventional method. To n-methyl-pyrrolidone (NMP) as a solvent, 94.9 wt % of $LiCoO_2$ as a cathode active material, 0.1 wt % of $Al(OH)_3$ having an average particle size of 0.8 μm and a specific surface area of about 11 $m^2/g$, 2.5 wt % of Super-P (conductive agent) and 2.5 wt % of polyvinylidene fluoride (PVDF; binder) were added to prepare mixed slurry for a cathode. The slurry was coated on an Al collector to form a cathode.

Additionally, a lithium foil was used as an anode. Further, 1M of $LiPF_6$ solution in EC/EMC was used as an electrolyte, to which 2 wt % of vinylene carbonate (VC) and 2 wt % of PS (propane sultone) was added, to form a coin-type battery.

Example 2

Example 1 was repeated to form a coin-type battery, except that $LiCoO_2$ as a cathode active material was used in the amount of 94 wt % and $Al(OH)_3$ was used in the amount of 1 wt %.

Example 3

Example 1 was repeated to form a coin-type battery, except that $LiCoO_2$ as a cathode active material was used in the amount of 93 wt % and $Al(OH)_3$ was used in the amount of 2 wt %.

Example 4

Example 1 was repeated to form a coin-type battery, except that $LiCoO_2$ as a cathode active material was used in the amount of 90 wt % and $Al(OH)_3$ was used in the amount of 5 wt %.

Example 5

Example 1 was repeated to form a coin-type battery, except that $LiCoO_2$ as a cathode active material was used in the amount of 85 wt % and $Al(OH)_3$ was used in the amount of 10 wt %.

Example 6

Example 2 was repeated to form a coin-type battery, except that $Al(OH)_3$ having an average particle size of 1.2 μm and a specific surface area of about 7 $m^2/g$ was used.

Example 7

Example 3 was repeated to form a coin-type battery, except that $Al(OH)_3$ having an average particle size of 1.2 μm and a specific surface area of about 7 $m^2/g$ was used.

Example 8

Example 2 was repeated to form a coin-type battery, except that $Al(OH)_3$ having an average particle size of 8 μm and a specific surface area of about 2.5 $m^2/g$ was used.

Example 9

Example 3 was repeated to form a coin-type battery, except that $Al(OH)_3$ having an average particle size of 8 μm and a specific surface area of about 2.5 $m^2/g$ was used.

Example 10

Figure 1:
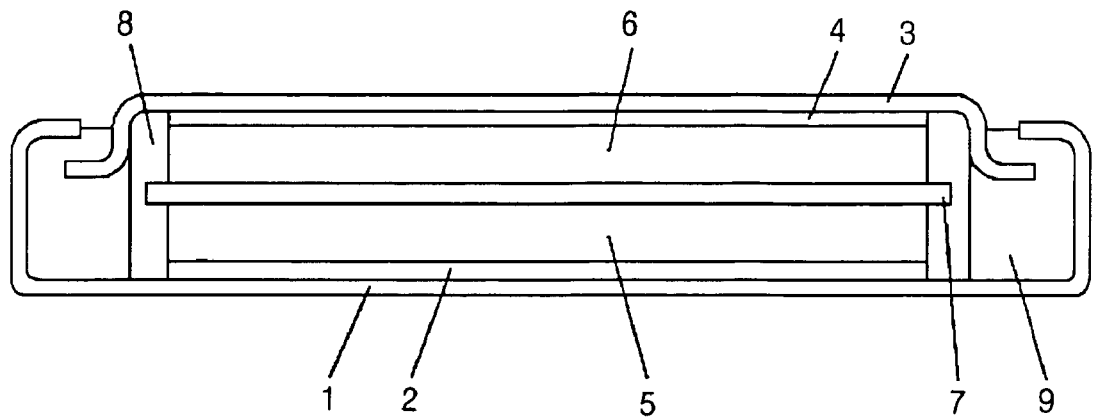
FIG. 1 is a sectional view of a conventional coin-type battery (1: case side by cathode, 2: cathode collector, 3: case side by anode, 4: anode collector, 5: cathode, 6: anode, 7: separator, 8: electrolyte, 9: gasket(packing))
Figure 2:
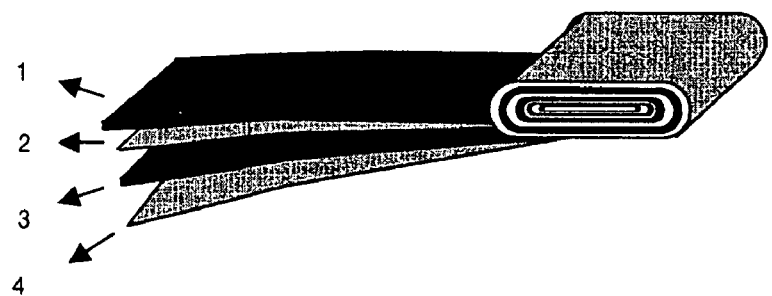
FIG. 2 is a schematic view showing an electrode roll to be inserted into a can, according to Example 10 (1: cathode, 2: separator, 3: anode, 4: separator)
Figure 3:
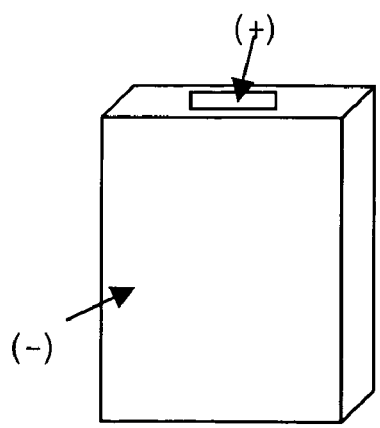
FIG. 3 is a schematic view showing a can of a prismatic battery used in Example 10.

A cathode, a porous separator and an anode were wound to form a rolled body, as shown in FIG. 2, and then the roll was inserted into a prismatic can, as shown in FIG. 3 to provide a battery to be used in this example. More particularly, to NMP (n-methyl-pyrrolidone) as a solvent, 92.5 wt % of $LiCoO_2$ as a cathode active material, 2.5 wt % of $Al(OH)_3$ having an average particle size of 8 μm and a specific surface area of about 2.5 $m^2/g$, 2.5 wt % of Super-P (conductive agent) and 2.5 wt % of polyvinylidene fluoride (PVDF; binder) were added to prepare mixed slurry for a cathode. The slurry was coated on an Al collector to form a cathode. Additionally, artificial graphite was used as an anode active material. To NMP as a solvent, 95.3 wt % of artificial graphite, 0.7 wt % of Super-P (conductive agent) and 4 wt % of PVDF (binder) were added to form mixed slurry for an anode. The slurry was coated on a Cu collector to form an anode. Further, 1M of $LiPF_6$ solution in EC/EMC was used as an electrolyte, to which 2 wt % of vinylene carbonate (VC) and 2 wt % of PS (propane sultone) was added.

Example 11

Example 2 was repeated to form a coin-type battery, except that Mg $(OH)_2$ having an average particle size of 1.0 μm and a specific surface area of about 12 $m^2/g$ was used instead of $Al(OH)_3$ having an average particle size of 0.8 μm and a specific surface area of about 11 $m^2/g$.

Example 12

Example 11 was repeated to form a coin-type battery, except that Mg $(OH)_2$ having an average particle size of 1.5 μm and a specific surface area of about 6 $m^2/g$ was used.

Example 13

Example 11 was repeated to form a coin-type battery, except that Mg $(OH)_2$ having an average particle size of 9 μm and a specific surface area of about 1.5 $m^2/g$ was used.

Comparative Example 1

Example 1 was repeated to form a coin-type battery, except that $LiCoO_2$ as a cathode active material was used in the amount of 95 wt % and $Al(OH)_3$ was not added.

Comparative Example 2

Example 10 was repeated to form a battery, except that $LiCoO_2$ as a cathode active material was used in the amount of 95 wt % and $Al(OH)_3$ was not added.

Storage Characteristic Test At High Temperature

Batteries obtained according to Examples 1 to 9 and Comparative Example 1 were charged at a charging current of 1 C to 4.2V and then were discharged at 1 C to 3V to determine initial discharge capacity (A). Additionally, the batteries were charged to 4.2V in the same manner as the above, and then stored at 80° C. for 12 hours. After storage, the batteries were discharged at 1 C to determine residual capacity (B). After determining residual capacity, 3 cycles of charge/discharge were performed for each battery to determine recovered capacity (B). Then, the ratio of residual capacity (B) to initial capacity (A) and that of recovered capacity (C) to initial capacity (A) were calculated to determine residual capacity ratio (B/A) and recovered capacity ratio (C/A), respectively. The results are shown in the following Tables 1 and 2.

TABLE 1

| | METAL HYDROXIDE | SPECIFIC SURFACE AREA OF METAL HYDROXIDE | ADDED AMOUNT OF METAL HYDROXIDE | RESIDUAL CAPACITY RATIO (%) | RECOVERED CAPACITY RATIO (%) |
|---|---|---|---|---|---|
| Ex. 2 | Al(OH)$_3$ | 11 m$^2$/g | 1 wt % | 92.3 | 97.1 |
| Ex. 3 | Al(OH)$_3$ | 11 m$^2$/g | 2 wt % | 93.7 | 98.1 |
| Ex. 6 | Al(OH)$_3$ | 7 m$^2$/g | 1 wt % | 90.3 | 93.5 |
| Ex. 7 | Al(OH)$_3$ | 7 m$^2$/g | 2 wt % | 92.0 | 95.2 |
| Ex. 8 | Al(OH)$_3$ | 2.5 m$^2$/g | 1 wt % | 89.6 | 93.2 |
| Ex. 9 | Al(OH)$_3$ | 2.5 m$^2$/g | 2 wt % | 91.7 | 95.5 |
| Ex. 11 | Mg(OH)$_2$ | 12 m$^2$/g | 1 wt % | 91.1 | 95.4 |
| Ex. 12 | Mg(OH)$_2$ | 6 m$^2$/g | 1 wt % | 91.0 | 94.1 |
| Ex. 13 | Mg(OH)$_2$ | 1.5 m$^2$/g | 1 wt % | 89.5 | 93.6 |
| Comp. Ex. 1 | — | — | — | 88.4 | 92.2 |

As can be seen from Table 1, a battery comprising Al(OH)$_3$ (Examples 2, 3, 6, 7, 8 and 9) shows improved residual capacity ratio and recovered capacity ratio compared to those of a battery comprising no Al(OH)$_3$ (Comparative Example 1). Also, a battery comprising 2 wt % of Al(OH)$_3$ (Examples 3, 7 and 9) shows residual capacity ratio and recovered capacity ratio greater than those of a battery comprising 1 wt % of Al(OH)$_3$ (Examples 2, 6 and 8).

When batteries comprising the same amount of Al(OH)$_3$ (Examples 2, 6 and 8; and Examples 3, 7 and 9) are compared, the larger the specific surface area of Al(OH)$_3$ is, the greater the residual capacity ratio and the recovered capacity ratio are. This shows that the action of Al(OH)$_3$ is accomplished on the powder surface. Practically, Example 8 using Al(OH)$_3$ having the smallest specific surface area shows little difference in terms of residual capacity ratio and recovered capacity ratio compared to Comparative Example 1 using no Al(OH)$_3$.

Similarly, when Mg(OH)$_2$ is used as a cathode additive instead of Al(OH)$_3$ (Examples 11 to 13), residual capacity ratio and recovered ratio are improved compared to Comparative Example 1 using no cathode additive. Additionally, the larger the specific surface area of Mg(OH)$_2$ is, the greater the residual capacity ratio and the recovered capacity ratio are.

Therefore, it is preferable to use powder having a relatively large specific surface area in order to obtain maximized effect in terms of storage properties of batteries at a high temperature by adding metal hydroxides which are not capable of lithium intercalation/deintercalation, while minimizing decrease of battery capacity.

battery comprising no Al(OH)$_3$ (Comparative Example 1). Further, a battery comprising 5 wt % of Al(OH)$_3$ (Example 4) shows residual capacity ratio and recovered ratio greater than those of a battery according to Comparative Example 1. However, a battery comprising 10 wt % of Al(OH)$_3$ (Example 5) shows residual capacity ratio and recovered ratio smaller than those of a battery according to Comparative Example 1.

Therefore, according to the present invention, it is preferable to use Al(OH)$_3$ as a cathode additive in an amount of not smaller than 0.1 wt % and less than 10 wt %.

In order to evaluate storage properties of batteries at a high temperature for batteries obtained by Example 10 and Comparative Example 2, prismatic batteries were used to perform a storage property test in a similar manner to the above-described test. The batteries were charged at a charging current of 1 C to 4.2V, and then discharged at 1 C to 3V to determine initial discharge capacity (A). Then, the batteries were charged again to 4.2V in the same manner as the above, and AC impedance of each battery was measured (AC impedance before storage at a high temperature). AC impedance is a measure for checking battery performance. Before storage at a high temperature, the values of AC impedance were similar in the case of Example 10 and Comparative Example 2, the values being about 60 mohm.

Additionally, after the batteries were stored at 80° C. for 10 days, AC impedance of each battery was measured and each battery was discharged at 1 C to determine residual capacity (B). After determining residual capacity, 3 cycles of charge/discharge were performed for each battery to determine recovered capacity (B). Then, the ratio of residual capacity

TABLE 2

| | METAL HYDROXIDE | SPECIFIC SURFACE AREA OF METAL HYDROXIDE | ADDED AMOUNT OF METAL HYDROXIDE | RESIDUAL CAPACITY RATIO (%) | RECOVERED CAPACITY RATIO (%) |
|---|---|---|---|---|---|
| Ex. 1 | Al(OH)$_3$ | 11 m$^2$/g | 0.1 wt % | 91.7 | 94.6 |
| Ex. 2 | Al(OH)$_3$ | 11 m$^2$/g | 1 wt % | 92.3 | 97.1 |
| Ex. 3 | Al(OH)$_3$ | 11 m$^2$/g | 2 wt % | 93.7 | 98.1 |
| Ex. 4 | Al(OH)$_3$ | 11 m$^2$/g | 5 wt % | 93.2 | 96.2 |
| Ex. 5 | Al(OH)$_3$ | 11 m$^2$/g | 10 wt % | 88.0 | 91.4 |
| Comp. Ex. 1 | — | — | — | 88.4 | 92.2 |

Table 2 shows the results of residual capacity ratio and recovered capacity ratio varied with added amounts of Al(OH)$_3$ having a specific surface area of about 11 m$^2$/g. As can be seen from Table 2, a battery comprising 0.1 wt % of Al(OH)$_3$ as a cathode additive (Example 1), residual capacity ratio and recovered capacity ratio are greater than those of a (B) to initial capacity (A) and that of recovered capacity (C) to initial capacity (A) were calculated to determine residual capacity ratio (B/A) and recovered capacity ratio (C/A), respectively. The results are shown in the following Table 3. Further, after storage at a high temperature, AC impedance values were compared.

TABLE 3

| | METAL HYDROXIDE | SPECIFIC SURFACE AREA OF METAL HYDROXIDE | ADDED AMOUNT OF METAL HYDROXIDE | RESIDUAL CAPACITY RATIO (%) | RECOVERED CAPACITY RATIO (%) | AC IMPEDANCE AFTER STORAGE AT HIGH TEMPERATURE (mohm) |
|---|---|---|---|---|---|---|
| Ex. 10 | Al(OH)$_3$ | 2.5 m$^2$/g | 2.5 wt % | 74 | 79 | 120 |
| Comp. Ex. 2 | — | — | — | 69 | 73 | 390 |

As can be seen from Table 3, when Al(OH)$_3$ is added to a cathode of a battery (Example 10), it is possible to prevent increase of AC impedance after storage at a high temperature, and to improve residual capacity ratio and recovered capacity ratio compared to Comparative Example 2 using no Al(OH)$_3$.

INDUSTRIAL APPLICABILITY

As can be seen from the foregoing text, according to the present invention, a metal hydroxide having a large specific surface area is added to a cathode of a battery as a cathode additive. Accordingly, it is possible to improve storage properties of a battery at a high temperature by using a metal hydroxide in a relatively small amount compared to the prior arts, thereby minimizing decrease of battery capacity due to increase of metal hydroxide addition.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A cathode for a battery, consisting of:
   (a) cathode active material particles;
   (b) metal hydroxide particles having a specific surface area of between 2.5 m$^2$/g and 100 m$^2$/g, as a cathode additive;
   (c) a conductive agent; and
   (d) a binder,
   wherein the metal hydroxide particles in the cathode are present in an amount of greater than 0 wt% and less than 10 wt%, and the cathode active material particles and the metal hydroxide particles in the cathode are a uniform mixture with each other, and
   wherein the metal hydroxide is Al(OH)$_3$ having an average particle size of 0.8 µm to 8 µm, or Mg(OH)$_2$ having an average particle size of 1.0 µm to 9 µm.

2. A lithium ion battery comprising the cathode as claimed in claim 1, an anode and a non-aqueous electrolyte, wherein the cathode comprises cathode active material particles; and the metal hydroxide particles having a specific surface area of between 2.5 m$^2$/g and 100 m$^2$/g, as a cathode additive; the conductive agent; and the binder, and the metal hydroxide particles in the cathode are present in an amount of greater than 0 wt% and less than 10 wt%, and the cathode active material particles and the metal hydroxide particles in the cathode are a uniform mixture with each other, and wherein the metal hydroxide is Al(OH)$_3$ having an average particle size of 0.8 µm to 8 µm, or Mg(OH)$_2$ having an average particle size of 1.0 µm to 9 µm.

3. The lithium ion battery according to claim 2, wherein the electrolyte comprises at least one additive selected from the group consisting of the compounds represented by the following formula 1 to formula 4:

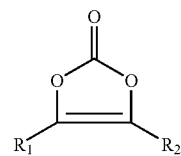
[formula 1]

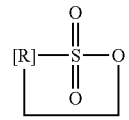
[formula 2]

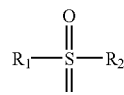
[formula 3]

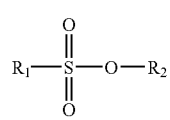
[formula 4]

wherein, each of R$_1$ and R$_2$ is independently selected from the group consisting of H, a C$_1$-C$_5$ alkenyl group, a C$_1$-C$_5$ alkyl group, a halogen atom, and a phenyl group and a phenoxy group non-substituted or substituted with a C$_1$-C$_5$ alkyl group or a halogen atom (formulae 1,3 and 4); and R is a C$_1$-C$_5$ alkenyl group or a C$_1$-C$_5$ alkyl group (formula 2).

4. The lithium ion battery according to claim 3, wherein the compound represented by formula 1 is selected from the group consisting of VC (vinylene carbonate) and methyl esters, and the compound represented by any one of formula 2 to formula 4 is selected from the group consisting of propane sultone (PS), propene sultone, dimethyl sulfone, diphenyl sulfone, divinyl sulfone and methanesulfonic acid.

* * * * *